United States Patent
Zhou et al.

(10) Patent No.: US 12,017,302 B2
(45) Date of Patent: Jun. 25, 2024

(54) STRESS AND TEXTURE MORPHOLOGY CONTROLLING METHOD FOR PREPARING SUPER-HYDROPHOBIC SURFACE OF ALUMINUM ALLOY BY LASER ETCHING

(71) Applicant: JIANGSU UNIVERSITY, Zhenjiang (CN)

(72) Inventors: Jianzhong Zhou, Zhenjiang (CN); Yanqiang Gou, Zhenjiang (CN); Shu Huang, Zhenjiang (CN); Xiankai Meng, Zhenjiang (CN); Pengfei Li, Zhenjiang (CN); Yu Zhang, Zhenjiang (CN)

(73) Assignee: JIANGSU UNIVERSITY, Zhenjiang (CN)

(*) Notice: Subject to any disclaimer, the term of this patent is extended or adjusted under 35 U.S.C. 154(b) by 0 days.

(21) Appl. No.: 18/272,610

(22) PCT Filed: Apr. 19, 2022

(86) PCT No.: PCT/CN2022/087544
§ 371 (c)(1),
(2) Date: Jul. 17, 2023

(87) PCT Pub. No.: WO2023/168794
PCT Pub. Date: Sep. 14, 2023

(65) Prior Publication Data
US 2024/0042552 A1 Feb. 8, 2024

(30) Foreign Application Priority Data
Mar. 8, 2022 (CN) .......................... 202210228035.5

(51) Int. Cl.
*B23K 26/362* (2014.01)
*B23K 26/70* (2014.01)

(52) U.S. Cl.
CPC .......... *B23K 26/362* (2013.01); *B23K 26/703* (2015.10)

(58) Field of Classification Search
None
See application file for complete search history.

(56) References Cited

U.S. PATENT DOCUMENTS 11,839,934 B1* 12/2023 Zhou .................... B23K 26/355

FOREIGN PATENT DOCUMENTS

| CN | 102581478 A | 7/2012 |
| CN | 104947116 A * | 9/2015 |

(Continued)

OTHER PUBLICATIONS

Machine translation of CN 104947116 A, Nov. 2023 (Year: 2023).*
Machine translation of CN 109366017 A, Nov. 2023 (Year: 2023).*
Machine translation of CN 209910123 U, Nov. 2023 (Year: 2023).*

*Primary Examiner* — Geoffrey S Evans
(74) *Attorney, Agent, or Firm* — Bayramoglu Law Offices LLC (57) ABSTRACT

A stress and texture morphology controlling method for preparing a super-hydrophobic surface of an aluminum alloy by laser etching includes the following steps: pretreating a surface of an aluminum alloy; fixing a pretreated aluminum alloy to an ultrasonic vibration platform, continuously charging flowing liquid nitrogen to a to-be-machined surface of the aluminum alloy, and controlling a flow of the liquid nitrogen to cool the to-be-machined surface of the aluminum alloy and keep the to-be-machined surface of the aluminum alloy at a low temperature; keeping stable flowing of the liquid nitrogen on the to-be-machined surface of the aluminum alloy after the to-be-machined surface of the aluminum alloy is cooled, using the ultrasonic vibration platform to generate a high-frequency ultrasonic vibration field, and etching the to-be-machined surface of the aluminum alloy to (Continued)

form a super-hydrophobic textured micro-nano structure surface; and reducing a surface energy of the super-hydrophobic textured micro-nano structure surface.

8 Claims, 7 Drawing Sheets

(56) References Cited

FOREIGN PATENT DOCUMENTS

| | | | | |
|---|---|---|---|---|
| CN | 107442942 | A | | 12/2017 |
| CN | 207695856 | U | | 8/2018 |
| CN | 109366017 | A | * | 2/2019 |
| CN | 110434043 | A | | 11/2019 |
| CN | 209910123 | U | * | 1/2020 |
| CN | 113059324 | A | | 7/2021 |
| CN | 113967796 | A | | 1/2022 |
| RU | 2014146427 | A | | 6/2016 |
| WO | WO-2011008114 | A1 | * | 1/2011 ......... B23K 26/3584 |

* cited by examiner

STRESS AND TEXTURE MORPHOLOGY CONTROLLING METHOD FOR PREPARING SUPER-HYDROPHOBIC SURFACE OF ALUMINUM ALLOY BY LASER ETCHING

CROSS REFERENCE TO THE RELATED APPLICATIONS

This application is the national phase entry of International Application No. PCT/CN2022/087544, filed on Apr. 19, 2022, which is based upon and claims priority to Chinese Patent Application No. 202210228035.5, filed on Mar. 8, 2022.

TECHNICAL FIELD

The present disclosure relates to the field of laser combined machining for surfaces of aluminum alloys, and in particular to a stress and texture morphology controlling method for preparing a super-hydrophobic surface of an aluminum alloy by laser etching.

BACKGROUND

Aeronautical aluminum alloys have been widely used to the aerospace field for its high strength, good toughness and plasticity, and desirable mechanical properties and machinability. In environments of low temperatures and high humidities, due to high surface wettability of the aeronautical aluminum alloys, many areas of the fuselage are covered by an ice layer, which seriously affects flight safety of an aircraft. Hence, it is of great significance to improve ice resistance on the surface of the fuselage.

Preparation of a super-hydrophobic surface on an aeronautical aluminum alloy material is effective to reduce icing on the fuselage. There have been many methods to realize super-hydrophobicity on the surface of the aluminum alloy material, including spraying, microelectrical discharge machining, templating, electroplating, sol-gel method, etc. However, these methods have their intrinsic limitations, such as complicated processes, strict conditions and hard large-area preparation. The prepared hydrophobic texture also shows a low strength and is vulnerable to abrasion, damage and failure. Therefore, the super-hydrophobic surface prepared on the aeronautical aluminum alloy with these methods is hardly applied to the aerospace field.

Laser etching for realizing the super-hydrophobicity on the surface of the aeronautical aluminum alloy has the advantages of high efficiency, environmental protection and high machining accuracy. With desirable machining flexibility, the laser etching can prepare hydrophobic structures of different shapes and sizes, and thus is considered as an important method for preparing the super-hydrophobic surface. For example, a method for preparing a super-hydrophobic surface of an aluminum alloy with a short pulse laser is disclosed in the prior art. The present disclosure etches a surface of an aluminum alloy with a short pulse laser under special process parameters to obtain a micro-nano hydrophobic structure, and performs baking with a drying oven, thereby preparing the super-hydrophobic surface on the aluminum alloy. A method for preparing a super-hydrophobic microstructure on a surface of an aluminum alloy through secondary nanosecond laser scanning is disclosed in the prior art. A micro-nano structure is prepared through the secondary nanosecond laser scanning. The method prepares the special microstructure by etching, thus achieving the super-hydrophobic surface of the aluminum alloy material. However, since the laser etching is an instant heating and shock cooling process, a high tensile stress is caused on the surface of the material to greatly affect mechanical properties of the base material of the aeronautical aluminum alloy. Due to the extremely high transient temperature in the laser etching, the surface material is molten and gasified. Under a certain laser etching force, a large number of material remolten spatters are formed on the surface of the texture. Consequently, the texture formed has a random morphology, a high hardenability and a poor mechanical stability. The wettability of the prepared super-hydrophobic surface of the aeronautical aluminum alloy cannot be effectively controlled, and the preparation effect is unstable. Therefore, improvements are made necessarily to the conventional laser etching process to ensure that after the super-hydrophobic surface of the aeronautical aluminum alloy is prepared, the base material has desirable mechanical properties, as well as stable and effective hydrophobicity and anti-acing effect.

SUMMARY

In view of shortages of the prior art, the present disclosure provides a stress and texture morphology controlling method for preparing a super-hydrophobic surface of an aluminum alloy by laser etching. A low-temperature field of flowing liquid nitrogen and a steerable high-frequency ultrasonic vibration field are introduced to assist laser etching to prepare the super-hydrophobic surface of the aeronautical aluminum alloy. After the super-hydrophobic surface is prepared, an internal stress of a base material of the aeronautical aluminum alloy and a morphology of a prepared hydrophobic structure can be effectively controlled. Meanwhile, with the flowing liquid nitrogen and the high-frequency vibration field, waste gas can be better exhausted in the laser etching, thereby improving transmissivity of laser. When the aeronautical aluminum alloy is etched by the laser in the liquid nitrogen environment, the molten aluminum alloy material reacts with nitrogen. Because of the high-frequency ultrasonic vibration field, a nitrogen content in the prepared micro-nano multi-stage hydrophobic texture is further improved, which greatly improves the strength of the prepared hydrophobic texture, and makes the super-hydrophobic surface of the aeronautical aluminum alloy more durable. The present disclosure can prepare the super-hydrophobic surface on aeronautical aluminum alloy materials of different sizes, and realize collaborative coupling control on the stress and texture morphology of the base material. The present disclosure can efficiently prepare the super-hydrophobic surface of the aeronautical aluminum alloy, while ensuring the high matrix strength, good hydrophobicity and texture morphology, strong durability and anisotropic droplet transmission.

The present disclosure achieves the above technical objective through the following technical solutions.

A stress and texture morphology controlling method for preparing a super-hydrophobic surface of an aluminum alloy by laser etching is provided, including the following steps:

pretreating a surface of the aluminum alloy;

fixing the pretreated aluminum alloy to an ultrasonic vibration platform, continuously charging flowing liquid nitrogen to a to-be-machined surface of the aluminum alloy, and controlling a flow of the liquid nitrogen to cool the to-be-machined surface of the aluminum alloy and keep the to-be-machined surface of the aluminum alloy at a low temperature;

keeping stable flowing of the liquid nitrogen on the to-be-machined surface of the aluminum alloy after the to-be-machined surface of the aluminum alloy is cooled, using the ultrasonic vibration platform to generate a high-frequency ultrasonic vibration field, and meanwhile etching the to-be-machined surface of the aluminum alloy with a laser to form a super-hydrophobic textured micro-nano structure surface; and reducing a surface energy of the super-hydrophobic textured micro-nano structure surface with chemical modification.

Further, the continuously flowing liquid nitrogen on the to-be-machined surface of the aluminum alloy has a gas flow of 20 L/min to 50 L/min, to keep the to-be-machined surface of the aluminum alloy at −80° C. to −120° C.

Further, the ultrasonic vibration platform is adjustable in vibration direction, and is configured to realize adjustment in any vibration direction within 0° to 180°, and has an output power of 300 W, a continuously adjustable vibration frequency of 20 kHz to 80 kHz, and a maximum output amplitude of 30 μm.

Further, the to-be-machined surface of the aluminum alloy is etched with a nanosecond laser; and the nanosecond laser has a focused spot diameter of 50 μm, and has a wavelength of 1,064 nm, a laser power of 20 W to 100 W, a repetition frequency of 10 kHz to 100 kHz, a pulse width of 100 ns, and a galvanometer scanning speed of 10 mm/s to 8,000 mm/s in machining.

Further, the reducing of the surface energy of the super-hydrophobic textured micro-nano structure surface with the chemical modification includes: soaking the laser etched aluminum alloy for 30 min to 90 min in an anhydrous ethanol solution containing 1-3% of perfluorooctyltriethoxysilane, followed by heat preservation for 40 min to 60 min in a thermotank at 90° C. to 120° C., where molecules of the perfluorooctyltriethoxysilane containing low-surface-energy —$CF_3$ and —$CF_2$ groups are bonded to the machined surface, to reduce the surface energy of the aluminum alloy material.

Further, the pretreating of the surface of the aluminum alloy specifically includes: machining the surface of the aluminum alloy to a surface roughness Ra of ≤30 μm, and ultrasonically cleaning the surface of the aluminum alloy in an anhydrous ethanol solution, followed by drying.

Further, a direction of the high-frequency ultrasonic vibration field generated by the ultrasonic vibration platform is perpendicular to the to-be-machined surface of the aluminum alloy.

Further, a direction of the high-frequency ultrasonic vibration field generated by the ultrasonic vibration platform is perpendicular to a laser sweeping direction on the to-be-machined surface of the aluminum alloy.

Further, a direction of the high-frequency ultrasonic vibration field generated by the ultrasonic vibration platform is parallel to a laser sweeping direction on the to-be-machined surface of the aluminum alloy.

The present disclosure has the following beneficial effects.

1. In the stress and texture morphology controlling method for preparing the super-hydrophobic surface of the aluminum alloy by laser etching provided by the present disclosure, flowing liquid nitrogen is used to provide a low-temperature environment for machining. Laser etching is performed in the low-temperature environment of the flowing liquid nitrogen, which can effectively inhibit expansion of grains in a base material due to a thermal effect of the laser etching, controls a tensile stress for internal heating of the base material, and improves mechanical properties of the base material.

2. According to the stress and texture morphology controlling method for preparing the super-hydrophobic surface of the aluminum alloy by laser etching provided by the present disclosure, with assistance of high-frequency ultrasonic vibration, the nanosecond pulse laser etches the aeronautical aluminum alloy material in the low-temperature environment of the liquid nitrogen to prepare a super-hydrophobic surface. The vibration frequency, amplitude and direction are controlled by adjusting working parameters of a high-frequency ultrasonic vibration platform. Under the influence of high-frequency ultrasonic vibration, molten substances generated by the laser etching are cooled quickly in the low-temperature environment. The hydrophobic textured micro-nano multi-stage surface structure formed has a certain direction, such that droplets have different rolling forces on the super-hydrophobic surface and are anisotropic. As a result, the droplets can be conveyed directionally, rolling resistances of condensed droplets on the surface of the fuselage are further reduced, the droplets flow quickly along a certain direction, and better icing resistance of the fuselage is achieved.

3. According to the stress and texture morphology controlling method for preparing the super-hydrophobic surface of the aluminum alloy by laser etching provided by the present disclosure, the low-temperature field of the flowing liquid nitrogen and the high-frequency ultrasonic vibration field are introduced to the laser etching, which makes waste gas from the laser etching less aggregated on a machining region, weakens a shielding effect for the laser, and improves a machining quality. By adjusting the molten material with the ultrasonic vibration, the nitrogen content is effectively improved in the texture prepared with the laser etching in the liquid nitrogen environment. Consequently, the strength and hardness of the formed texture are increased, and the super-hydrophobic surface has a higher mechanical stability.

4. According to the stress and texture morphology controlling method for preparing the super-hydrophobic surface of the aluminum alloy by laser etching provided by the present disclosure, all process parameters can be controlled in a computer. The present disclosure has advantages of simple operation, low cost, high efficiency and ease of implementation for industrial application. It overcomes drawbacks of the conventional laser etching from the thermal effect, effectively controls the internal stress, and prepares the high-performance, stable and anisotropic super-hydrophobic surface of the aeronautical aluminum alloy. For a service environment of the aeronautical aluminum alloy, the present disclosure greatly prolongs the service life, and has a wide prospect in industrial application.

BRIEF DESCRIPTION OF THE DRAWINGS

To describe the technical solutions in embodiments of the present disclosure or in the prior art more clearly, the accompanying drawings required for describing the embodiments or the prior art will be briefly described below. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

The present disclosure will be further described below with reference to the accompanying drawings and specific embodiments, but the protection scope of the present disclosure is not limited thereto.

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative, which are merely intended to explain the present disclosure, rather than to limit the present disclosure.

It should be understood that, in the description of the present disclosure, the terms such as "central", "longitudinal", "transverse", "length", "width", "thickness", "upper", "lower", "axial", "radial", "vertical", "horizontal", "inner", and "outer" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure. Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified and limited, the terms "installed", "connected with", "connected to", and "fixed" should be understood in a board sense. For example, the connection may be a fixed connection, a detachable connection or an integrated connection, may be a mechanical connection or an electrical connection, may be a direct connection or an indirect connection with use of an intermediate medium, or may be intercommunication between two components. Those of ordinary skill in the art may understand specific meanings of the above terms in the present disclosure based on a specific situation.

Figure 1:
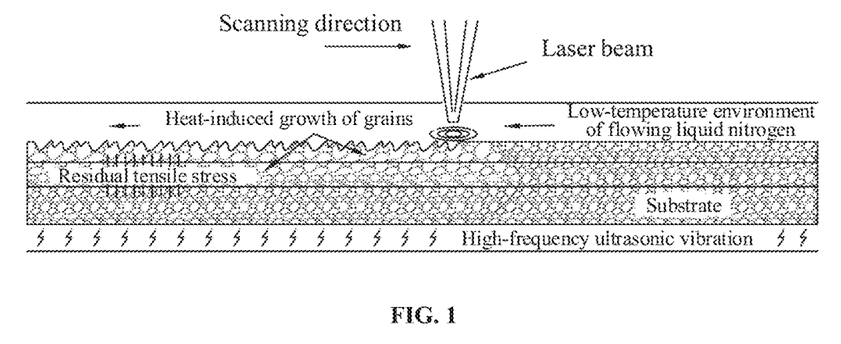
FIG. 1 illustrates a stress and texture morphology controlling method for preparing a super-hydrophobic surface of an aluminum alloy by laser etching according to the present disclosure.

As shown in FIG. 1, the present disclosure provides a stress and texture morphology controlling method for preparing a super-hydrophobic surface of an aluminum alloy by laser etching, including the following steps.

A surface of an aluminum alloy is pretreated.

A pretreated aluminum alloy is fixed to an ultrasonic vibration platform, flowing liquid nitrogen is continuously charged to a to-be-machined surface of the aluminum alloy, and a flow of the liquid nitrogen is controlled to cool the to-be-machined surface of the aluminum alloy and keep the to-be-machined surface of the aluminum alloy at a low temperature.

Stable flowing of the liquid nitrogen on the to-be-machined surface of the aluminum alloy is kept after the to-be-machined surface of the aluminum alloy is cooled, the ultrasonic vibration platform is used to generate a high-frequency ultrasonic vibration field, and the to-be-machined surface of the aluminum alloy is etched with a laser to form a super-hydrophobic textured micro-nano structure surface.

A surface energy of the super-hydrophobic textured micro-nano structure surface is reduced with chemical modification.

According to the stress and texture morphology controlling method for preparing the super-hydrophobic surface of the aluminum alloy by laser etching provided by the present disclosure, in a low-temperature environment of flowing liquid nitrogen, high-frequency ultrasonic vibration is used to assist laser etching to prepare a hydrophobic texture on a surface of the aeronautical aluminum alloy. The laser etching is performed in the low-temperature environment, which inhibits heat-induced growth of grains in a base material, controls a residual tensile stress from a thermal effect in the etching, and improves mechanical properties of the base material. By setting parameters of the high-frequency ultrasonic vibration, such as an applied direction, an amplitude and a frequency, the morphology of the hydrophobic texture prepared with the laser etching can be controlled, and droplets on the super-hydrophobic surface are transmitted anisotropically. With the flowing liquid nitrogen and the high-frequency ultrasonic vibration field, waste gas from the laser etching can be better exhausted to improve the transmissivity of the laser, and the efficiency and quality of the laser etching. The laser etching is performed in the liquid nitrogen environment, such that molten aluminum material reacts with nitrogen. With the high-frequency ultrasonic vibration field, nitrogen elements in the texture can be effectively increased, the strength and hardness of the texture are improved, and the finally formed super-hydrophobic surface has a higher mechanical stability.

In order to make the objectives, technical solutions and advantages of the present disclosure more apparent, by taking a 2024-T351 aeronautical aluminum alloy as a study object, the present disclosure will be described in detail below with reference to the accompanying drawings and three specific examples.

Example 1

A stress and texture morphology controlling method for preparing a super-hydrophobic surface of an aluminum alloy by laser etching provided by the present disclosure includes the following steps.

(1) A 2024-T351 aeronautical aluminum alloy sheet was cut into a 50 mm×50 mm×3 mm square sample with wire cutting. A surface of the sample was ground by sandpaper having particle sizes of 400 #, 800 #, 1000 #, 1500 # and 2000 #, and polished on a grinding and polishing machine, to have a mirror-like effect of Ra≤50 μm. The surface of the sample was ultrasonically cleaned for 5 min in an anhydrous ethanol solution, and dried in a vacuum drying oven for later use.

(2) An obtained aluminum alloy sample was clamped onto a high-frequency ultrasonic vibration platform. Liquid nitrogen was charged to a gas inlet of a transparent machining cover, and flowed out from a gas outlet. A gas flow was controlled at 25 L/min, such that a surface machining temperature of the aluminum alloy sample was cooled to −90° C.±5° C.

Figure 2:
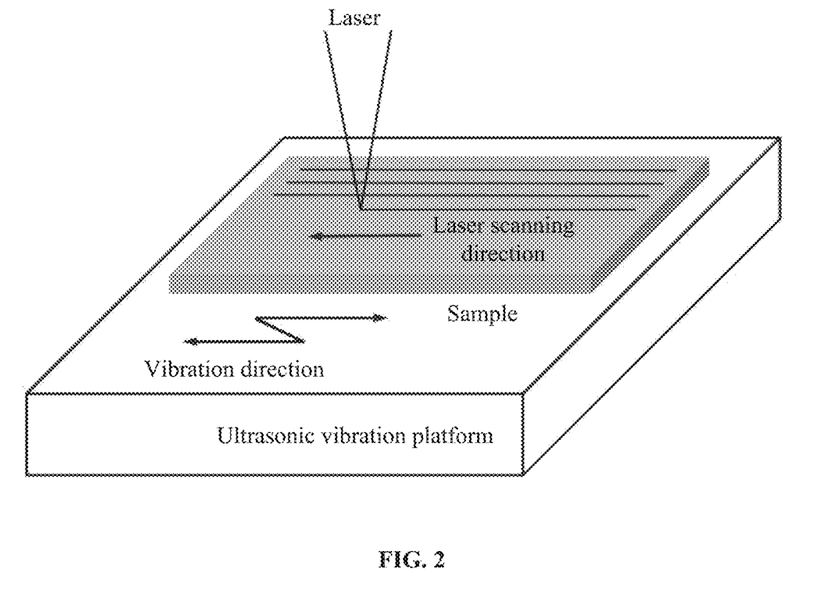
FIG. 2 schematically illustrates an applied direction of high-frequency ultrasonic vibration according to Example 1 of the present disclosure.

(3) Stable flowing of the liquid nitrogen was kept after the cooling. The ultrasonic vibration platform was turned on to assist a nanosecond pulse laser to etch the surface of the aluminum alloy. The ultrasonic vibration platform had an ultrasonic vibration direction shown in FIG. 2, and specifically had an output power of 300 W, a continuously adjustable vibration frequency of 20 kHz, and an output amplitude of 4 μm.

(4) The nanosecond laser was an IPG-HP-100 type nanosecond pulse laser. The nanosecond laser had a focused spot diameter of 50 μm, and had a wavelength of 1,064 nm, a laser power of 35 W, a repetition frequency of 30 kHz, a pulse width of 100 ns, and a galvanometer scanning speed of 200 mm in the laser etching. The scanning path included parallel straight lines spaced at 50 μm.

(5) Upon completion of the laser etching, the aeronautical aluminum alloy sample was soaked for 40 min in an anhydrous ethanol solution containing 1.5% of perfluorooctyltriethoxysilane. Heat preservation was performed for 40 min in a thermotank at 120° C. In this process, molecules of the perfluorooctyltriethoxysilane containing low-surface-energy —$CF_3$ and —$CF_2$ groups are bonded to the surface of the sample, to reduce a surface energy of the aluminum alloy material, and preparing a super-hydrophobic surface of the aluminum alloy.

Figure 5:
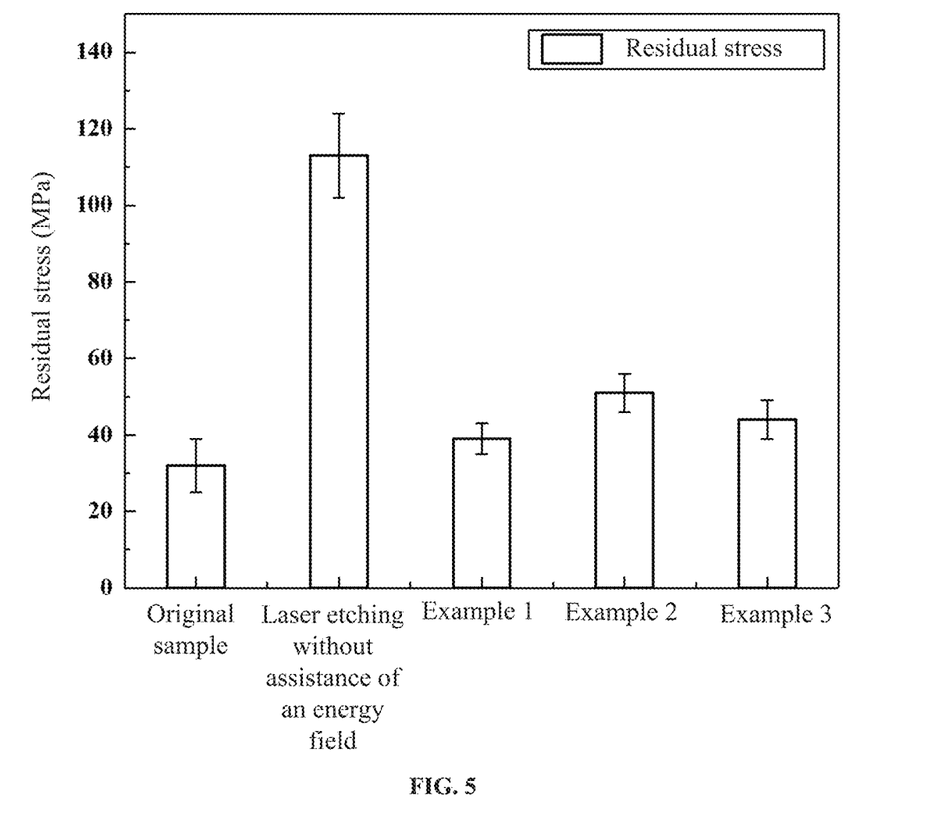
FIG. 5 illustrates residual stresses in depth directions of various processes according to the present disclosure.
Figure 6:
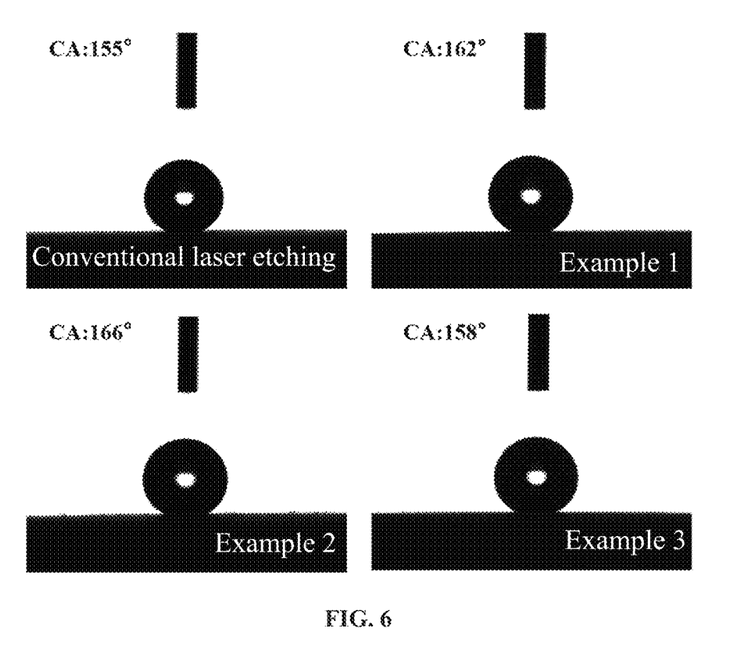
FIG. 6 illustrates surface contact angles in various processes according to the present disclosure.
Figure 7:
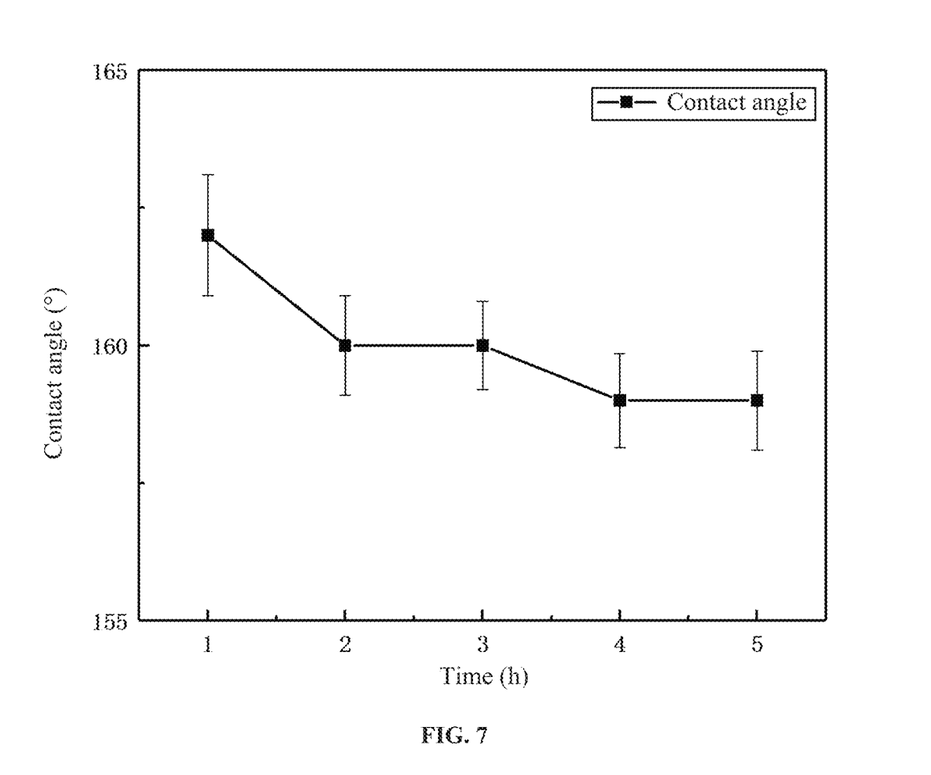
FIG. 7 illustrates a changing curve for contact angles of droplets on a prepared surface in different ultrasonic vibration time according to Example 1 of the present disclosure.
Figure 8:
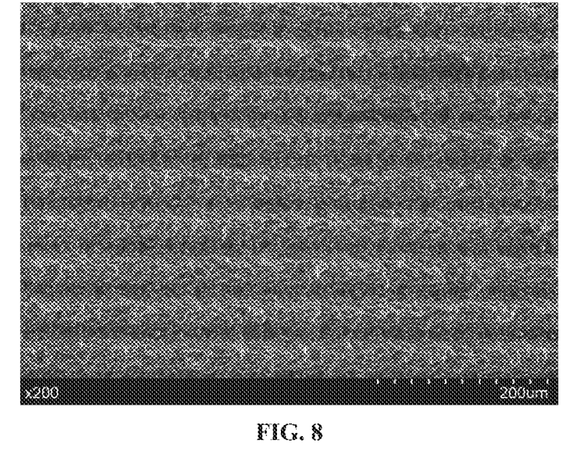
FIG. 8 illustrates a Scanning Electron Microscopy (SEM) image of a texture morphology according to Example 1 of the present disclosure.

As shown in FIG. 5, the super-hydrophobic surface of the aeronautical aluminum alloy in Example 1 has an average residual stress of 39±4 MPa at 100 μm toward the surface. The average residual stress is slightly increased from 32±7 MPa in the base material of the untreated sample, but decreased by 65.5% relative to 113±11 MPa at the same position of the base material in laser etching without assistance of an energy field. The method for preparing the super-hydrophobic surface of the aeronautical aluminum alloy provided by the present disclosure can greatly reduce a thermal effect of conventional laser etching. As shown in FIG. 6, droplets on the surface of a sample prepared with the conventional laser etching have a contact angle of 155° and a sliding angle of 6°, while droplets on the surface of the sample in Example 1 have a contact angle of 162°. As shown in FIG. 8, the prepared super-hydrophobic surface texture has a certain direction, so there are anisotropic sliding angles on the super-hydrophobic surface. Under guidance of a micro-nano multi-stage texture, the droplets have a rolling angle of less than 3° in a same direction, and a rolling angle of greater than 8° in reverse directions. As shown in FIG. 7, ultrasonic vibration can damage the micro-nano multi-stage texture. As vibration time increases, the contact angles for the droplets on the super-hydrophobic surface are reduced to some extent, but can still be maintained at 155° or above after 5 h. The sliding angles of the droplets are still anisotropic. It can be seen that the prepared super-hydrophobic surface of the aeronautical aluminum alloy has a higher mechanical stability.

Example 2

A stress and texture morphology controlling method for preparing a super-hydrophobic surface of an aluminum alloy by laser etching provided by the present disclosure includes the following steps.

(1) A square sample of a 2024-T351 aeronautical aluminum alloy sheet obtained by wire cutting was grounded and polished with sandpaper of different particle sizes. A surface of the sample was ultrasonically cleaned in an anhydrous ethanol solution, and dried in a vacuum drying oven for later use.

(2) An obtained pretreated aeronautical aluminum alloy sample was clamped onto a high-frequency ultrasonic vibration platform. Liquid nitrogen was charged to a gas inlet of a transparent machining cover, and flowed out from a gas outlet. A gas flow was controlled at 35 L/min, such that a surface machining temperature of the aluminum alloy sample was cooled to −100° C.±5° C.

Figure 3:
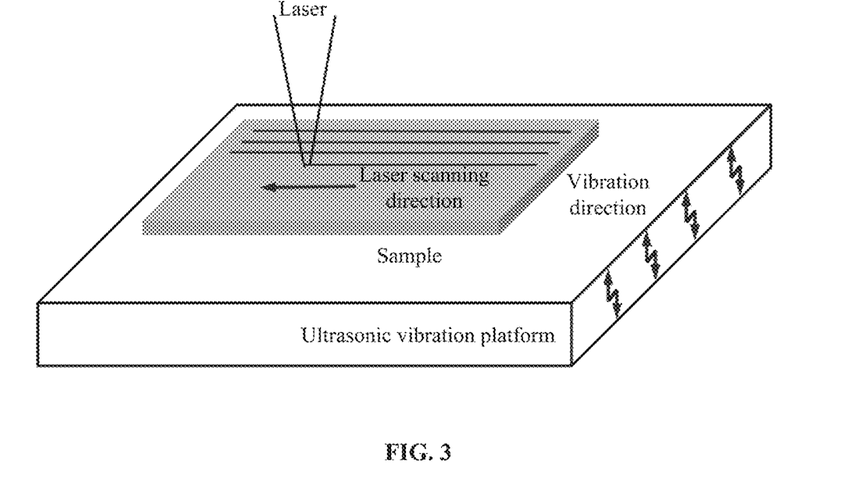
FIG. 3 schematically illustrates an applied direction of high-frequency ultrasonic vibration according to Example 2 of the present disclosure.

(3) Stable flowing of the liquid nitrogen was kept after the cooling. The ultrasonic vibration platform was turned on to assist a nanosecond pulse laser to etch the surface of the aluminum alloy sample. The ultrasonic vibration platform had an ultrasonic vibration direction shown in FIG. 3, and specifically had an output power of 300 W, a continuously adjustable vibration frequency of 30 kHz, and an output amplitude of 6 μm.

(4) The nanosecond laser was an IPG-HP-100 type nanosecond pulse laser. The nanosecond laser had a focused spot diameter of 50 μm, and had a wavelength of 1,064 nm, a laser power of 50 W, a repetition frequency of 20 kHz, a pulse width of 100 ns, and a galvanometer scanning speed of 200 mm in the laser etching. The scanning path included parallel straight lines spaced at 50 μm.

(5) Upon completion of the laser etching, the aeronautical aluminum alloy sample was soaked for 40 min in an anhydrous ethanol solution containing 1% of perfluorooctyltriethoxysilane. Heat preservation was performed for 60 min in a thermotank at 100° C. In this process, molecules of the perfluorooctyltriethoxysilane are bonded to the surface of the aeronautical aluminum alloy sample through chemical reaction, to reduce a surface energy of the material, and preparing a super-hydrophobic surface.

Figure 9:
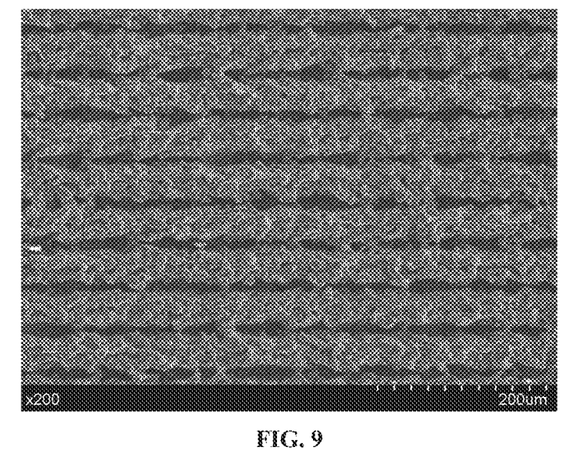
FIG. 9 illustrates an SEM image of a texture morphology according to Example 2 of the present disclosure.

The super-hydrophobic surface of the aeronautical aluminum alloy in Example 2 has an average residual stress of 51±5 MPa at 100 μm toward the surface. The average residual stress is decreased by 54.9% relative to 113±11 MPa at the same position of the base material in laser etching without assistance of an energy field, which greatly weakens a thermal effect arising from the laser etching. Droplets on the surface of the sample in Example 2 have a contact angle of 166°. As shown in FIG. 9, there are isotropic sliding angles, and the droplets in different directions have the sliding angle of 3°. Compared with the super-hydrophobic surface obtained with the conventional laser etching, the residual tensile stress in the base material is greatly reduced, the micro-nano structure on the surface of the hydrophobic texture is denser, the droplets have a better sliding angle, and the hydrophobicity is further improved.

Example 3

A stress and texture morphology controlling method for preparing a super-hydrophobic surface of an aluminum alloy by laser etching provided by the present disclosure includes the following steps.

(1) A surface of an aluminum alloy was ground by sandpaper of different particle sizes, and polished on a grinding and polishing machine, until a mirror-like effect (Ra≤30 μm) was achieved on the surface of the aluminum alloy material. The surface of the sample was ultrasonically cleaned in an anhydrous ethanol solution, and dried for later use.

(2) A pretreated sample was clamped onto a high-frequency ultrasonic vibration platform. Liquid nitrogen was charged to a gas inlet of a transparent machining cover, and flowed out from a gas outlet. A gas flow was controlled at 45 L/min, such that a surface machining temperature of the aluminum alloy sample was cooled to −120° C.±5° C.

Figure 4:
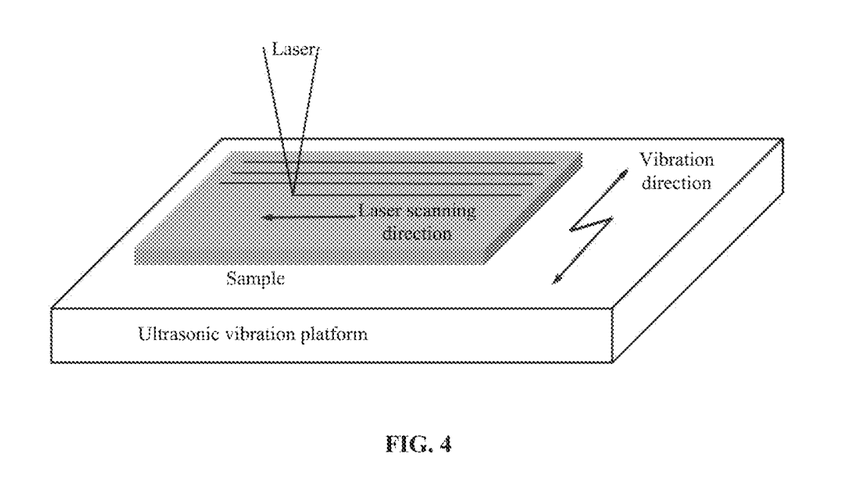
FIG. 4 schematically illustrates an applied direction of high-frequency ultrasonic vibration according to Example 3 of the present disclosure.

(3) Stable flowing of the liquid nitrogen was kept, such that the machining temperature was stable at a low temperature. The ultrasonic vibration platform was turned on to assist a nanosecond pulse laser to etch the surface of the aluminum alloy sample. The ultrasonic vibration platform had an ultrasonic vibration direction shown in FIG. 4, and specifically had an output power of 300 W, a continuously adjustable vibration frequency of 50 kHz, and an output amplitude of 10 μm.

(4) The nanosecond laser was an IPG-HP-100 type nanosecond pulse laser. The nanosecond laser had a focused spot diameter of 50 μm, and had a wavelength of 1,064 nm, a laser power of 50 W, a repetition frequency of 30 kHz, a pulse width of 100 ns, and a galvanometer scanning speed of 400 mm in the laser etching. The scanning path included parallel straight lines spaced at 50 μm.

(5) Upon completion of the laser etching, the aeronautical aluminum alloy sample was soaked for 40 min in an anhydrous ethanol solution containing 2% of perfluorooctyltriethoxysilane. Heat preservation was performed for 50 min in a thermotank at 110° C., to reduce a surface energy of the material, and preparing a super-hydrophobic surface.

Figure 10:
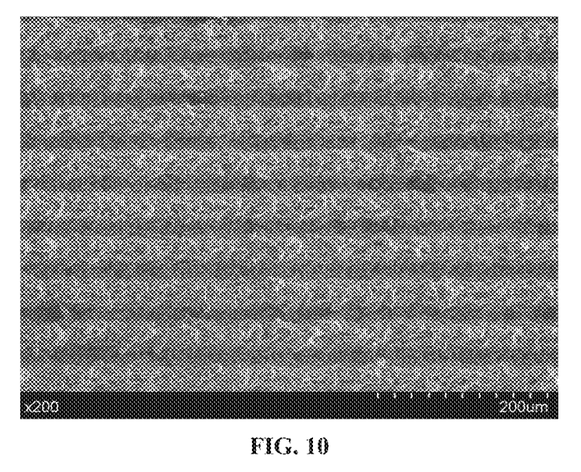
FIG. 10 illustrates an SEM image of a texture morphology according to Example 3 of the present disclosure.

The super-hydrophobic surface of the aeronautical aluminum alloy in Example 3 has an average residual stress of 44±5 MPa at 100 μm toward the surface. The average residual stress is decreased by 61.1% relative to 113±11 MPa at the same position of the base material in laser etching without assistance of an energy field. Droplets on the surface of the sample in Example 3 have a contact angle of 158°. As shown in FIG. 10, the difference between sliding angles of the droplets in different directions was up to 8°. Therefore, the internal residual stress and texture morphology of the base material after the super-hydrophobic surface was prepared with the laser etching are effectively controlled, and the droplets on the prepared surface have anisotropic sliding angles. This is favorable for directional transmission of the droplets.

It should be understood that although this specification is described in accordance with the examples, not every example only includes one independent technical solution. This description of the specification is for the sake of clarity only. Those skilled in the art should take the specification as a whole, and the technical solutions in examples can also be appropriately combined to form other implementations that can be understood by those skilled in the art.

The series of detailed description listed above are only specific illustration of feasible examples of the present disclosure, rather than limiting the claimed scope of the present disclosure. All equivalent examples or changes made without departing from the technical spirit of the present disclosure should be included in the claimed scope of the present disclosure.

What is claimed is:

1. A stress and texture morphology controlling method for preparing a super-hydrophobic surface of an aluminum alloy by laser etching, comprising the following steps:
   pretreating a surface of the aluminum alloy;
   fixing the pretreated aluminum alloy to an ultrasonic vibration platform, continuously charging flowing liquid nitrogen to a to-be-machined surface of the aluminum alloy, and controlling a flow of the liquid nitrogen to cool the to-be-machined surface of the aluminum alloy and keep the to-be-machined surface of the aluminum alloy at a low temperature, wherein the continuously flowing liquid nitrogen on the to-be-machined surface of the aluminum alloy has a liquid flow of 20 L/min to 50 L/min, to keep the to-be-machined surface of the aluminum alloy at −80° C. to −120° C.;
   keeping stable flowing of the liquid nitrogen on the to-be-machined surface of the aluminum alloy after the to-be-machined surface of the aluminum alloy is cooled, using the ultrasonic vibration platform to generate a high-frequency ultrasonic vibration field, and meanwhile etching the to-be-machined surface of the aluminum alloy with a laser to form a super-hydrophobic textured micro-nano structure surface, wherein laser etching is performed in a liquid nitrogen environment, such that a molten aluminum alloy reacts with the nitrogen; with the high-frequency ultrasonic vibration field, nitrogen elements in a super-hydrophobic texture are increased; and an ultrasonic vibration frequency ranges continuously and adjustably from 20 kHz to 80 kHz; and
   reducing a surface energy of the super-hydrophobic textured micro-nano structure surface with a chemical modification.

2. The stress and texture morphology controlling method for preparing the super-hydrophobic surface of the aluminum alloy by laser etching according to claim 1, wherein the ultrasonic vibration platform is adjustable in a vibration direction, and is configured to realize an adjustment in any vibration direction within 0° to 180°, and has an output power of 300 W, and a maximum output amplitude of 30 μm.

3. The stress and texture morphology controlling method for preparing the super-hydrophobic surface of the aluminum alloy by laser etching according to claim 1, wherein the to-be-machined surface of the aluminum alloy is etched with a nanosecond laser; and the nanosecond laser has a focused spot diameter of 50 μm, and has a wavelength of 1,064 nm, a laser power of 20 W to 100 W, a repetition frequency of 10 kHz to 100 kHz, a pulse width of 100 ns, and a galvanometer scanning speed of 10 mm/s to 8,000 mm/s in machining.

4. The stress and texture morphology controlling method for preparing the super-hydrophobic surface of the aluminum alloy by laser etching according to claim 1, wherein the reducing of the surface energy of the super-hydrophobic textured micro-nano structure surface with the chemical modification comprises: soaking the laser etched aluminum alloy for 30 min to 90 min in an anhydrous ethanol solution containing 1-3% of perfluorooctyltriethoxysilane, followed by a heat preservation for 40 min to 60 min in a thermotank at 90° C. to 120° C., wherein molecules of the perfluorooctyltriethoxysilane containing low-surface-energy -$CF_3$ and -$CF_2$ groups are bonded to the machined surface, to reduce the surface energy of the aluminum alloy material.

5. The stress and texture morphology controlling method for preparing the super-hydrophobic surface of the aluminum alloy by laser etching according to claim 1, wherein the pretreating of the surface of the aluminum alloy comprises:

machining the surface of the aluminum alloy to a surface roughness Ra of ≤30 μm, and ultrasonically cleaning the surface of the aluminum alloy in an anhydrous ethanol solution, followed by drying.

6. The stress and texture morphology controlling method for preparing the super-hydrophobic surface of the aluminum alloy by laser etching according to claim 1, wherein a direction of the high-frequency ultrasonic vibration field generated by the ultrasonic vibration platform is perpendicular to the to-be-machined surface of the aluminum alloy.

7. The stress and texture morphology controlling method for preparing the super-hydrophobic surface of the aluminum alloy by laser etching according to claim 1, wherein a direction of the high-frequency ultrasonic vibration field generated by the ultrasonic vibration platform is perpendicular to a laser sweeping direction on the to-be-machined surface of the aluminum alloy.

8. The stress and texture morphology controlling method for preparing the super-hydrophobic surface of the aluminum alloy by laser etching according to claim 1, wherein a direction of the high-frequency ultrasonic vibration field generated by the ultrasonic vibration platform is parallel to a laser sweeping direction on the to-be-machined surface of the aluminum alloy.

* * * * *